No. 813,177. PATENTED FEB. 20, 1906.
Z. SCOTT.
VESSEL.
APPLICATION FILED MAY 12, 1904.

2 SHEETS—SHEET 1.

Witnesses:
Inventor,
Z. Scott

No. 813,177. PATENTED FEB. 20, 1906.
Z. SCOTT.
VESSEL.
APPLICATION FILED MAY 12, 1904.

2 SHEETS—SHEET 2.

Witnesses:
Inventor
Z. Scott,
By
Attorneys

UNITED STATES PATENT OFFICE.

ZACCHEUS SCOTT, OF WEST NEWTON, PENNSYLVANIA.

VESSEL.

No. 813,177.　　　Specification of Letters Patent.　　　Patented Feb. 20, 1906.

Application filed May 12, 1904. Serial No. 207,658.

*To all whom it may concern:*

Be it known that I, ZACCHEUS SCOTT, a citizen of the United States of America, residing at West Newton, in the county of Westmoreland and State of Pennsylvania, have invented certain new and useful Improvements in Vessels, of which the following is a specification, reference being had therein to the accompanying drawings.

This invention relates to certain new and useful improvements in vessels, and relates more particularly to an attachment for warships.

The present invention has for its object the provision of novel means whereby mines, bombs, and torpedoes may be easily removed from their positions, and thereby prevent injury to the vessels.

The invention still further contemplates to provide an attachment that may be readily raised or lowered and also adjusted to any desired extended position.

With the above and other objects in view the invention consists in the novel construction, combination, and arrangement of parts to be hereinafter more fully described and claimed.

In describing the invention in detail reference is had to the accompanying drawings, forming a part of this application, in which—

Figure 1:
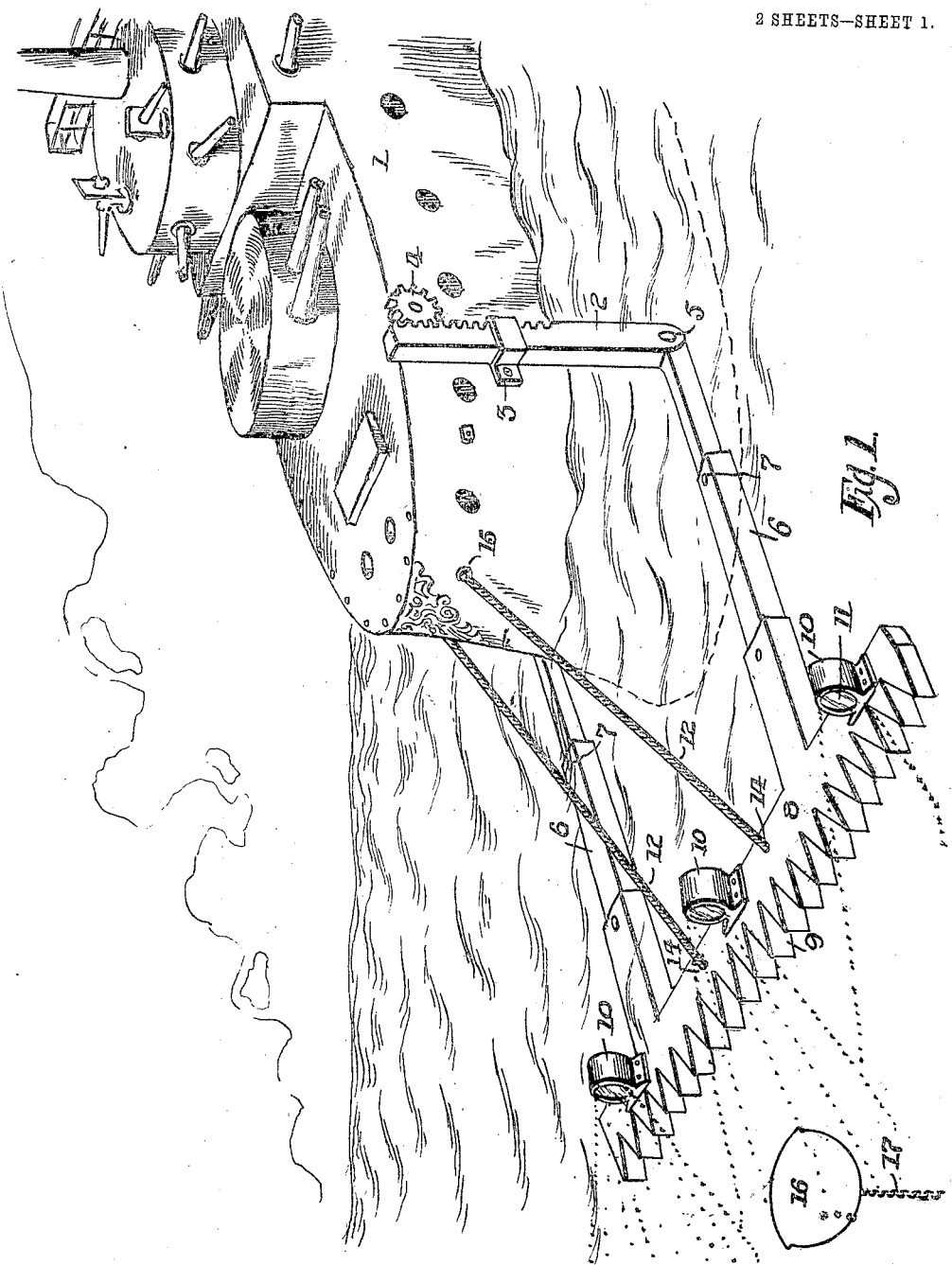
Figure 2:
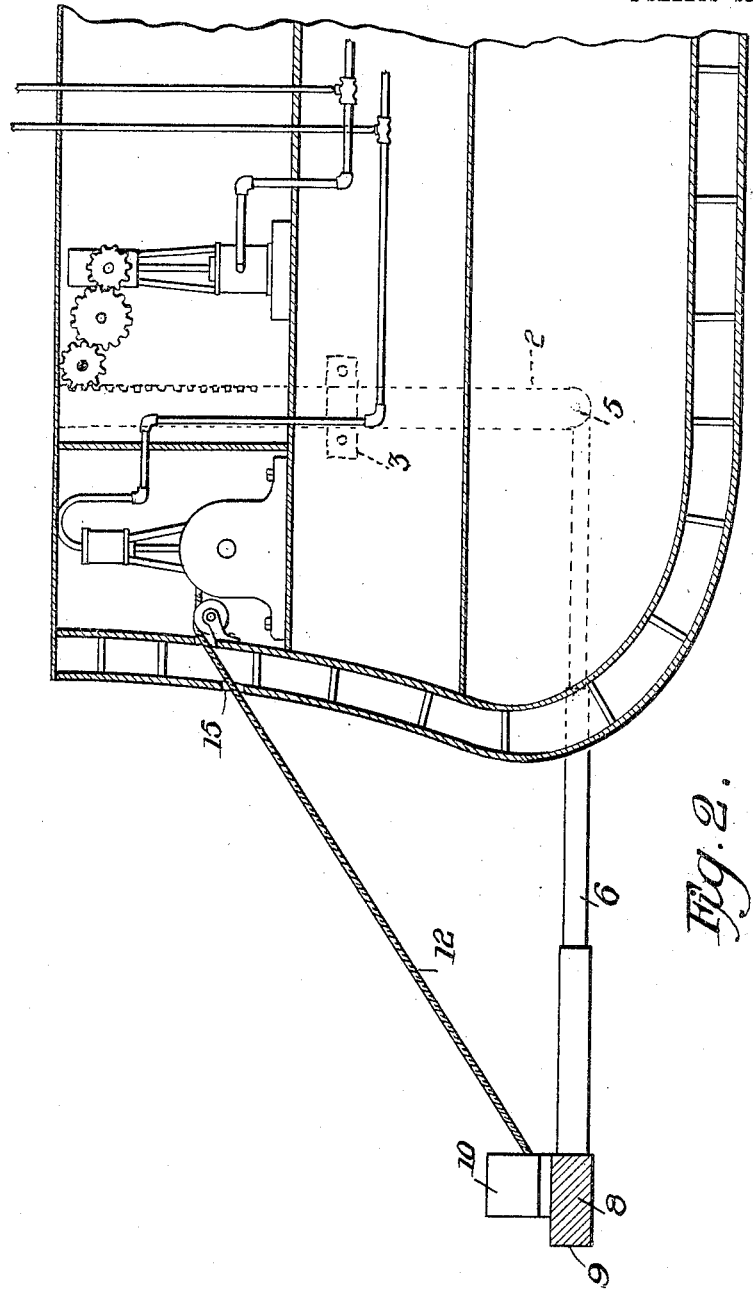

Figure 1 is a perspective view of the forward end of a battle-ship with my improved attachment secured thereto, and Fig. 2 is a vertical longitudinal section of the same.

In the drawings the reference-numeral 1 represents the bow end of the battle-ship, having secured on each side vertical cog-racks 2, operating through suitable guides 3, rigidly secured to the vessel, said cog-racks meshing with pinions 4, which may be operated in any suitable manner. The lower ends of the cog-racks 2 are pivotally secured at 5 to telescopic arms 6, which are secured in the locked position by means of a locking-pin 7, extending through suitable openings formed in the sections. At the forward end of the telescopic arms is attached a cutter-bar 8, carrying teeth 9. Upon said cutter-bar are arranged a number of casings 10, carrying reflectors 11, said casings being provided with electric lamps for the purpose of more readily locating the shells and torpedoes. Cables 12 are attached at 14 to the cutter-bar and extend through port-holes 15, formed in the vessel, and a suitable drum or reel is located within the vessel for the purpose of raising or lowering the cutter-bar, as may be desired. The bomb or shell 16, having an electrical connection 17, is shown as located in front of the cutter-bar, and as the latter travels forward the cutter-bar will sever the connection, which will prevent an explosion taking place.

The many advantages obtained by the use of my improved attachment will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

1. The combination with a vessel, of vertically-movable rack-bars mounted on the side of the vessel adjacent the bow, gear-wheels meshing with said rack-bars, means for revolving said gear-wheels to raise and lower the rack-bars, sectional telescoping arms pivotally attached to said rack-bars, a cutter-bar rigidly connecting the outer ends of said telescoping arms, cables attached to said cutter-bar, and extending rearwardly and upwardly therefrom to the vessel, and means for exerting tension on said cables to raise said cutter-bar, and means for locking the telescoping bars in extended position.

2. In an apparatus of the character described, the combination of a vessel, vertically-movable rack-bars mounted on the vessel adjacent the bow thereof, means for raising and lowering said bars, horizontal arms pivotally secured to said vertically-movable bars, a cutter-bar carried by said horizontal arms and extending laterally beyond the said horizontal arms on each side, cables attached to said cutter-bars and extending to the vessel, and means for exerting tension on the cables to raise the cutter-bar.

3. In an attachment for war vessels, the combination of vertical racks, pinions to raise and lower said vertical racks, guides secured to the vessel embracing said racks, extensible horizontal arms pivotally secured to the lower end of said racks, a cutter-bar secured to the ends of said arms, and means attached to said cutter-bar whereby the same may be raised or lowered, substantially as described.

In testimony whereof I affix my signature in the presence of two witnesses.

ZACCHEUS SCOTT.

Witnesses:
   H. C. EVERT,
   WM. C. HEITZ.